(12) United States Patent
Velasquez et al.

(10) Patent No.: US 11,890,849 B1
(45) Date of Patent: Feb. 6, 2024

(54) METHODS AND SYSTEMS FOR INITIATING LAYER SEPARATION WITHIN A MULTILAYER COMPOSITE STRUCTURE

(71) Applicant: The Boeing Company, Chicago, IL (US)

(72) Inventors: Luis F. Velasquez, Ladson, SC (US); Allen J. Halbritter, Manning, SC (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/057,286

(22) Filed: Nov. 21, 2022

(51) Int. Cl.
*B32B 38/00* (2006.01)
*B26D 3/28* (2006.01)

(52) U.S. Cl.
CPC .............. *B32B 38/105* (2013.01); *B26D 3/28* (2013.01); *B32B 2605/18* (2013.01)

(58) Field of Classification Search
CPC ...... B32B 38/105; B32B 2605/18; B26D 3/28
See application file for complete search history.

(56) References Cited

U.S. PATENT DOCUMENTS

| | | | |
|---|---|---|---|
| 9,358,770 B2 | 6/2016 | Dong et al. | |
| 9,517,615 B2 | 12/2016 | Dong et al. | |
| 9,630,391 B2 | 4/2017 | Zhao | |
| 2015/0314584 A1* | 11/2015 | Dong | B32B 43/00 156/701 |
| 2019/0160801 A1* | 5/2019 | Wang | B32B 38/10 |
| 2020/0148491 A1* | 5/2020 | Lin | B29C 63/0095 |

FOREIGN PATENT DOCUMENTS

| | | |
|---|---|---|
| DE | 202013002818 | 6/2013 |
| DE | 102012019982 | 4/2014 |

* cited by examiner

*Primary Examiner* — Cynthia L Schaller
(74) *Attorney, Agent, or Firm* — Walters & Wasylyna LLC

(57) ABSTRACT

A method for initiating separation of a first layer from a second layer of a multilayer composite structure having a free edge, the method includes steps of securing the multilayer composite structure to a work surface; and applying cyclic pressure to at least a portion of the free edge of the multilayer composite structure.

20 Claims, 10 Drawing Sheets

METHODS AND SYSTEMS FOR INITIATING LAYER SEPARATION WITHIN A MULTILAYER COMPOSITE STRUCTURE

FIELD

This application relates to composite manufacturing and, more particularly, to systems and methods for initiating layer separation within a multilayer composite structure, such as separation of a backing film from a composite ply.

BACKGROUND

Normal pre-impregnated composite ply materials in raw form regularly come kitted with a backing paper or backing film having a tacky consistency. The type of backing film and amount of tack vary among different composite material types.

For the purposes of automated pick and place and layup processes, the backing film must be removed from the composite ply prior to layup. The process of removing this backing film is difficult due to the tack between the backing film and the composite ply as well as the unstable, draping nature of the raw material. A solution is needed for separating the backing film from the composite material at an edge so that the backing film can be peeled off using a separate mechanism.

Accordingly, those skilled in the art continue with research and development efforts in the field of composite manufacturing.

SUMMARY

Disclosed are methods for initiating separation of a first layer from a second layer of a multilayer composite structure having a free edge.

In one general example, the disclosed method includes steps of (1) securing the multilayer composite structure to a work surface; and (2) applying cyclic pressure to at least a portion of the free edge of the multilayer composite structure.

In one or more specific examples of the disclosed method, the step of applying the cyclic pressure may be performed at least until the first layer begins to separate from the second layer proximate the portion of the free edge of the multilayer composite structure.

In one or more specific examples of the disclosed method, the step of applying the cyclic pressure may include defining a pressure chamber such that the portion of the free edge of the multilayer composite structure is received within the pressure chamber.

In one or more specific examples of the disclosed method, the step of applying the cyclic pressure may include defining a pressure chamber such that the portion of the free edge of the multilayer composite structure is received within the pressure chamber, and the pressure chamber may be at least partially defined by sealingly engaging a pressure housing with the multilayer composite structure.

In one or more specific examples of the disclosed method, the step of applying the cyclic pressure may include defining a pressure chamber such that the portion of the free edge of the multilayer composite structure is received within the pressure chamber, and the step of applying the cyclic pressure may further include fluidly coupling the pressure chamber with an external pressure source.

In one or more specific examples of the disclosed method, the step of applying the cyclic pressure may include defining a pressure chamber, which has a volume, such that the portion of the free edge of the multilayer composite structure is received within the pressure chamber, and the step of applying the cyclic pressure may further include changing the volume of the pressure chamber.

In one or more specific examples of the disclosed method, the step of applying the cyclic pressure may include defining a pressure chamber such that the portion of the free edge of the multilayer composite structure is received within the pressure chamber, and the cyclic pressure may have a frequency of at least 2 cycles per second.

In one or more specific examples of the disclosed method, one of the first layer and the second layer may include a composite ply and the other of the first layer and the second layer may include a backing film connected to the composite ply.

In one or more specific examples of the disclosed method, one of the first layer and the second layer may include a composite ply and the other of the first layer and the second layer may include a backing film connected to the composite ply, and the step of applying the cyclic pressure may induce vibrations within the multilayer composite structure that weaken the connection between the backing film and the composite ply.

In one or more specific examples of the disclosed method, one of the first layer and the second layer may include a composite ply and the other of the first layer and the second layer may include a backing film connected to the composite ply, and the composite ply may include reinforcement material pre-impregnated with an uncured thermoset resin.

In one or more specific examples, the method may further include the step of cutting a bulk sheet of multilayer composite material to yield the multilayer composite structure and a peripheral portion separated from the multilayer composite structure by a cut line.

In another general example, one of the first layer and the second layer includes a composite ply and another of the first layer and the second layer includes a backing film connected to the composite ply, and the method includes steps of (1) securing the multilayer composite structure to a work surface; (2) cutting a bulk sheet of multilayer composite material to yield the multilayer composite structure and a peripheral portion separated from the multilayer composite structure by a cut line; and (3) applying cyclic pressure to at least a portion of the free edge of the multilayer composite structure while engaging the multilayer composite structure with a vibrating cantilever beam.

Also disclosed are systems for initiating separation of a first layer from a second layer of a multilayer composite structure having a free edge.

In one general example, the disclosed system includes a work surface to which the multilayer composite structure is secured; and a pressure housing defining a pressure chamber when the pressure housing is secured against the multilayer composite structure, wherein a pressure within in the pressure chamber is cycled to initiate separation of the first layer from the second layer.

In one or more specific examples, the system may further include an external pressure source, wherein the pressure chamber is in fluid communication with the external pressure source.

In one or more specific examples, the system may further include an external pressure source, wherein the pressure chamber is in fluid communication with the external pressure source by way of a fluid port and a fluid line.

In one or more specific examples, the system may further include an external pressure source, wherein the pressure chamber is in fluid communication with the external pressure source, and wherein the pressure housing may be a substantially rigid structure.

In one or more specific examples, the system may further include an external pressure source, wherein the pressure chamber is in fluid communication with the external pressure source, and wherein the external pressure source controls the pressure within the pressure chamber.

In one or more specific examples, the system may further include an external pressure source, wherein the pressure chamber is in fluid communication with the external pressure source, and wherein the external pressure source includes at least one of a positive pressure source and a vacuum source.

In one or more specific examples, the system may further include an external pressure source, wherein the pressure chamber is in fluid communication with the external pressure source, and wherein the external pressure source alternates between automated and manual cycling.

In one or more specific examples of the disclosed system, the pressure housing may be a flexible structure.

In one or more specific examples of the disclosed system, the pressure housing may be a flexible structure, and the system may further include a plunging actuator positioned to engage the pressure housing, wherein manipulation of the plunging actuator relative to the pressure housing controls a volume of the pressure chamber and, thus, the pressure within the pressure chamber.

In one or more specific examples of the disclosed system, the pressure housing may be a flexible structure, and the system may further include a plunging actuator positioned to engage the pressure housing, wherein manipulation of the plunging actuator relative to the pressure housing controls a volume of the pressure chamber and, thus, the pressure within the pressure chamber, wherein operation of the plunging actuator (126) varies between automated and manual operation.

In one or more specific examples, the system may further include a seal positioned between the pressure housing and the multilayer composite structure.

In one or more specific examples of the disclosed system, one of the first layer and the second layer may include a composite ply and the other of the first layer and the second layer may include a backing film connected to the composite ply.

In one or more specific examples of the disclosed system, the pressure within the pressure chamber may be cycled at a frequency of at least 2 Hz.

In one or more specific examples of the disclosed system, the pressure within the pressure chamber may be cycled at a frequency of at least 4 Hz.

In one or more specific examples of the disclosed system, the pressure within the pressure chamber may be cycled at a frequency of at least 10 Hz.

In one or more specific examples, the disclosed system may further include a vibrating cantilever beam engaging the composite material structure proximate the pressure housing.

Other examples of the disclosed systems and methods for initiating layer separation within a multilayer composite structure will become apparent from the following detailed description, the accompanying drawings, and the appended claims.

DETAILED DESCRIPTION

Disclosed are systems and methods for initiating layer separation within a multilayer composite structure. The specific examples used to initiate layer separation within a multilayer composite structure may vary, though the end result is a cyclic pressure that is applied to a free edge of the multilayer composite structure, which initiates layer separation. The specific components and arrangements described herein are exemplary. They are not intended to limit the scope of the claims in any way.

In accordance with the disclosed systems and methods, a multilayer composite structure is secured to a work surface and cyclic pressure is applied to a free edge of the multilayer composite structure until one layer of the multilayer composite structure begins to separate from an adjacent layer of the multilayer composite structure. The layers of the multilayer composite structure may be of sufficient strength and durability to withstand cyclic pressure, as described herein.

Without being limited to any particular theory, it is presently believed that the repetitive cycling of the pressure within a pressure chamber will generate vibrations at the free edge of the multilayer composite structure, causing layer separation (e.g., separation of a backing film from an adjacent composite ply). Once layer separation is initiated, the application of cyclic pressure may continue, so as to effect further layer separation or a subsequent (automated or manual) operation may be used effect complete layer separation (e.g., to completely separate the backing film from the adjacent composite ply).

Figure 1:
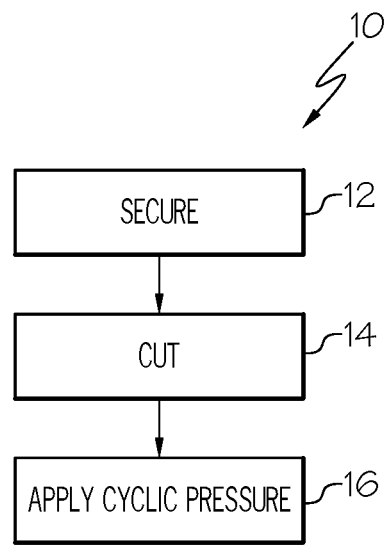
FIG. 1 is a flow diagram of an example of a method for separating a backing film from a composite ply.
Figure 2:
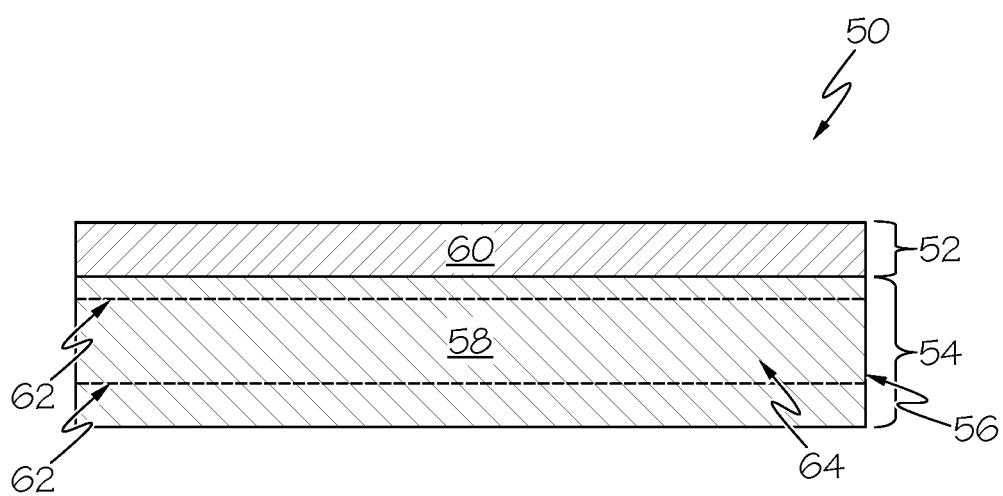
FIG. 2 is a side view, in cross-section, of a multilayer composite structure that includes at least one composite ply and a backing film applied to the composite ply.

Referring to FIGS. 1 and 2, illustrated is an example of the disclosed method (10) for separating a first layer (52) from a second layer (54) of a multilayer composite structure (50). The multilayer composite structure (50) has a free edge (56). In one particular example, the free edge (56) may include a corner (55), as shown in FIG. 3.

In one particular implementation, the first layer (52) of the multilayer composite structure (50) may be a backing film (60) and the second layer (54) may be a composite ply (58). The composite ply (58) includes reinforcement material (62), such as carbon fibers or the like, and an uncured thermoset resin (64), such as an epoxy-based thermoset resin. The backing film (60) may adhere to the composite ply (58) due to the tacky nature of the uncured thermoset resin (64).

The method (10) begins with the step of securing (12) the multilayer composite structure (50) to a work surface (71). In one expression, the work surface (71) may be a workbench. In another expression, the work surface (71) may be a cutting table. In yet another expression, the work surface (71) may be a vacuum table.

Figure 3:
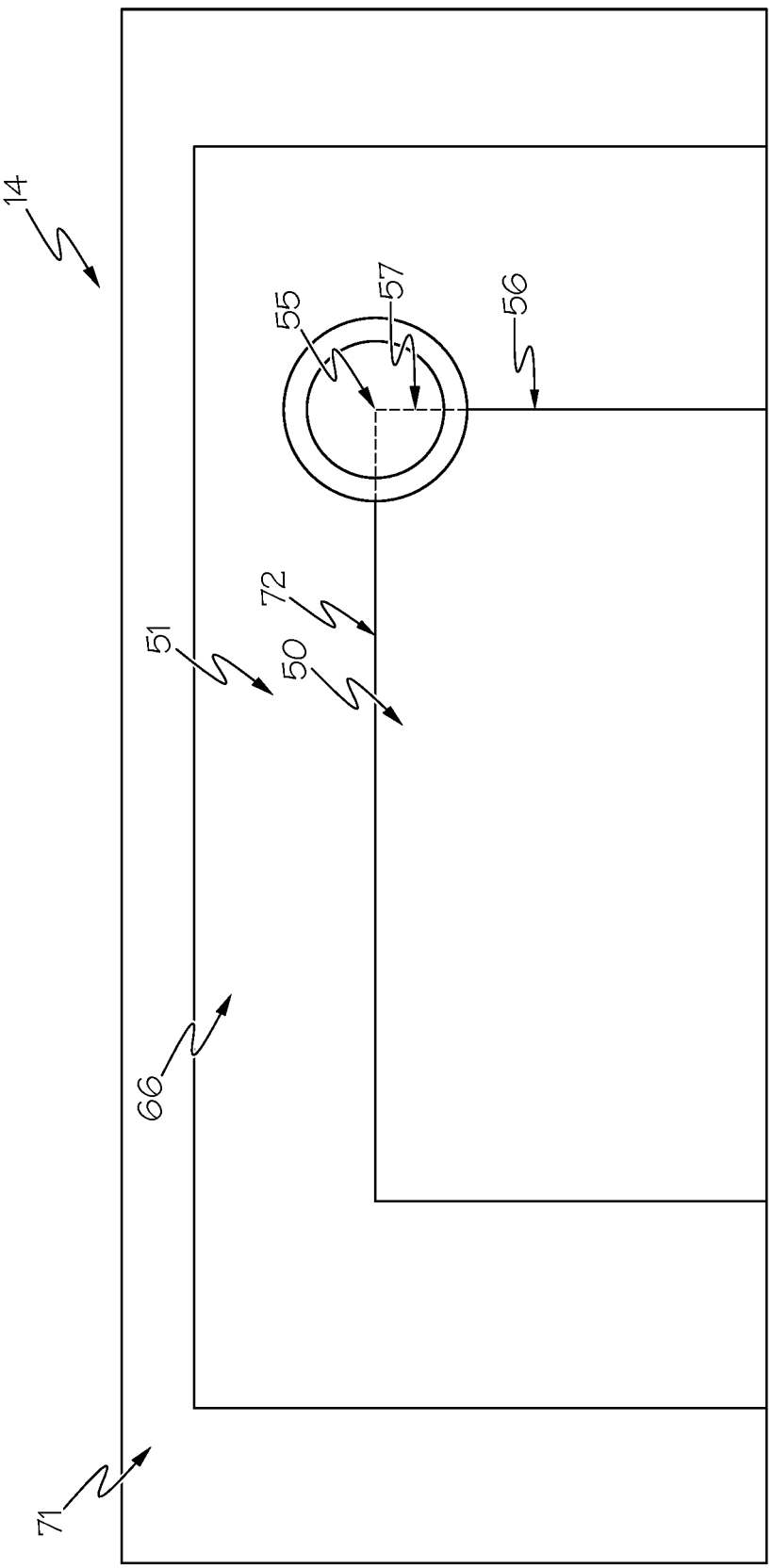
FIG. 3 is a top view of a multilayer composite structure secured to a work surface prior to removal of a backing film from a composite ply.

FIG. 3 depicts the multilayer composite structure (50) secured to a work surface (71). Securement between the multilayer composite structure (50) and the work surface (71) may be due to tack (e.g., the multilayer composite structure (50) may include uncured resin that is tacky). Alternatively, securement between the multilayer composite structure (50) and the work surface (71) may be due to vacuum pressure being pulled through the work surface (71), such as when the work surface (71) is a vacuum table. Still alternatively, securement between the multilayer composite structure (50) and the work surface (71) may be by way of mechanical securement features, such as clamps, mechanical fasteners, or the like.

Referring now to FIGS. 1 and 3, the method (10) may further include the step of cutting (14) a bulk sheet of multilayer composite material (66) to yield the multilayer composite structure (50) and a peripheral portion (51). The peripheral portion (51) may be separated from the multilayer composite structure (50) by a cut line (72). The cut line (72) may define the free edge (56) of the multilayer composite structure (50).

Still referring to FIG. 3, the cutting (14) may be performed by a knife or the like, such as an ultrasonic knife. The cutting (14) may direct the cut line (72) entirely through the multilayer composite structure (50), down to the subjacent work surface (71). Care may be taken not to damage the subjacent work surface (71).

At this point, those skilled in the art will appreciate that the cutting (14) may be performed after the securing (12), particularly when the work surface (71) is a cutting table, vacuum table, or the like. However, it is also contemplated that the cutting (14) would be performed prior to the securing (12), such as when the cutting (14) is performed at a different location than the work surface (71).

Figure 4:
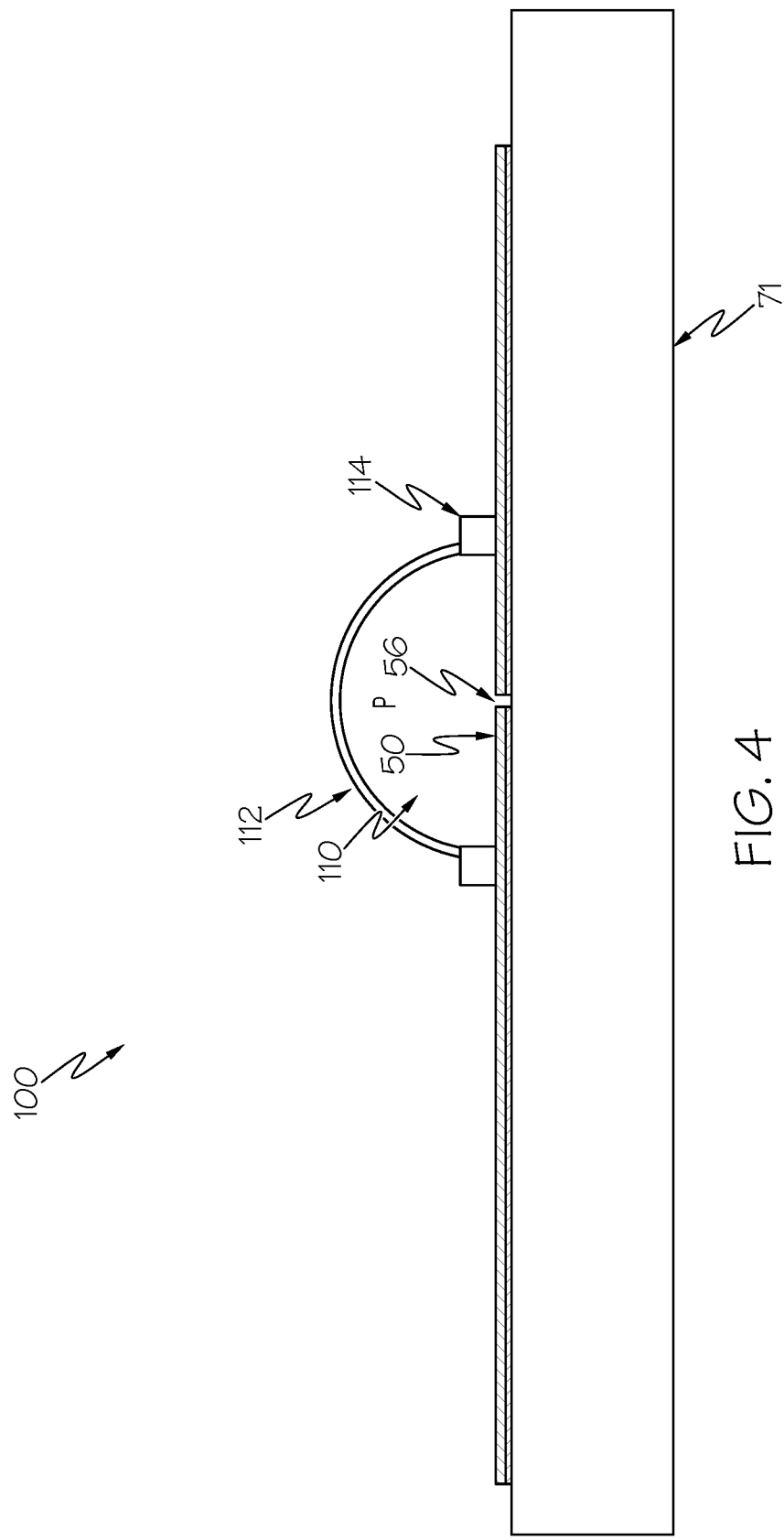
FIG. 4 is a side view of a multilayer composite structure secured to a work surface prior to removal of a backing film from a composite ply.

Referring now to FIGS. 1 and 4, the method (10) further includes the step of applying (16) cyclic pressure (P) to at least a portion (57) of the free edge (56) of the multilayer composite structure (50). The step of applying (16) cyclic pressure (P) to at least a portion (57) of the free edge (56) of the multilayer composite structure (50) may induce vibrations within the multilayer composite structure (50), which may weaken the connection between the backing film (60) and the composite ply (58).

Figure 8:
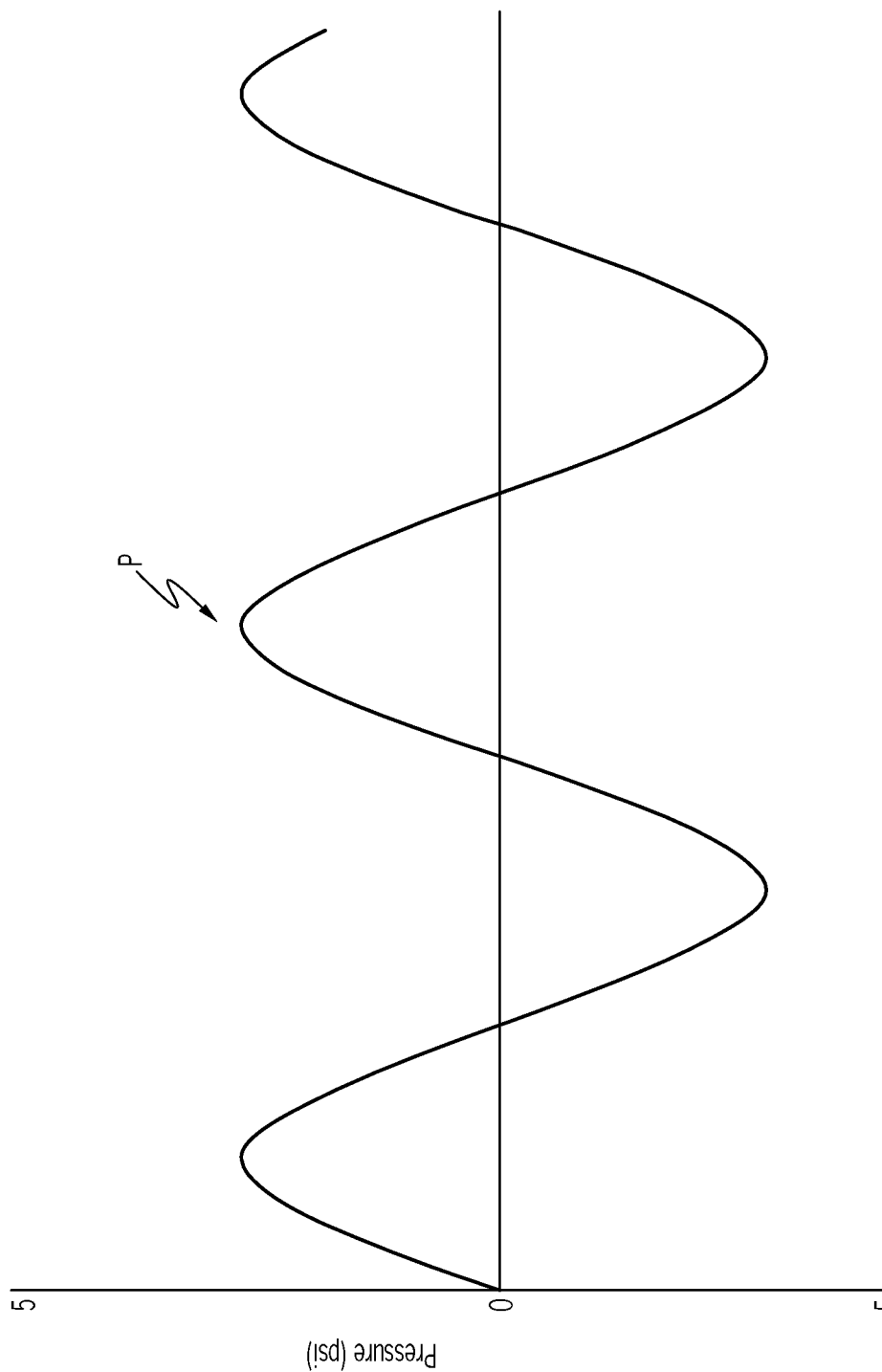
FIG. 8 is a graph depicting exemplary pressure versus time in a pressure chamber used to apply cyclic pressure to at least a portion of the free edge of the multilayer composite structure, wherein the pressure is shown alternating from positive to negative (vacuum).
Figure 9:
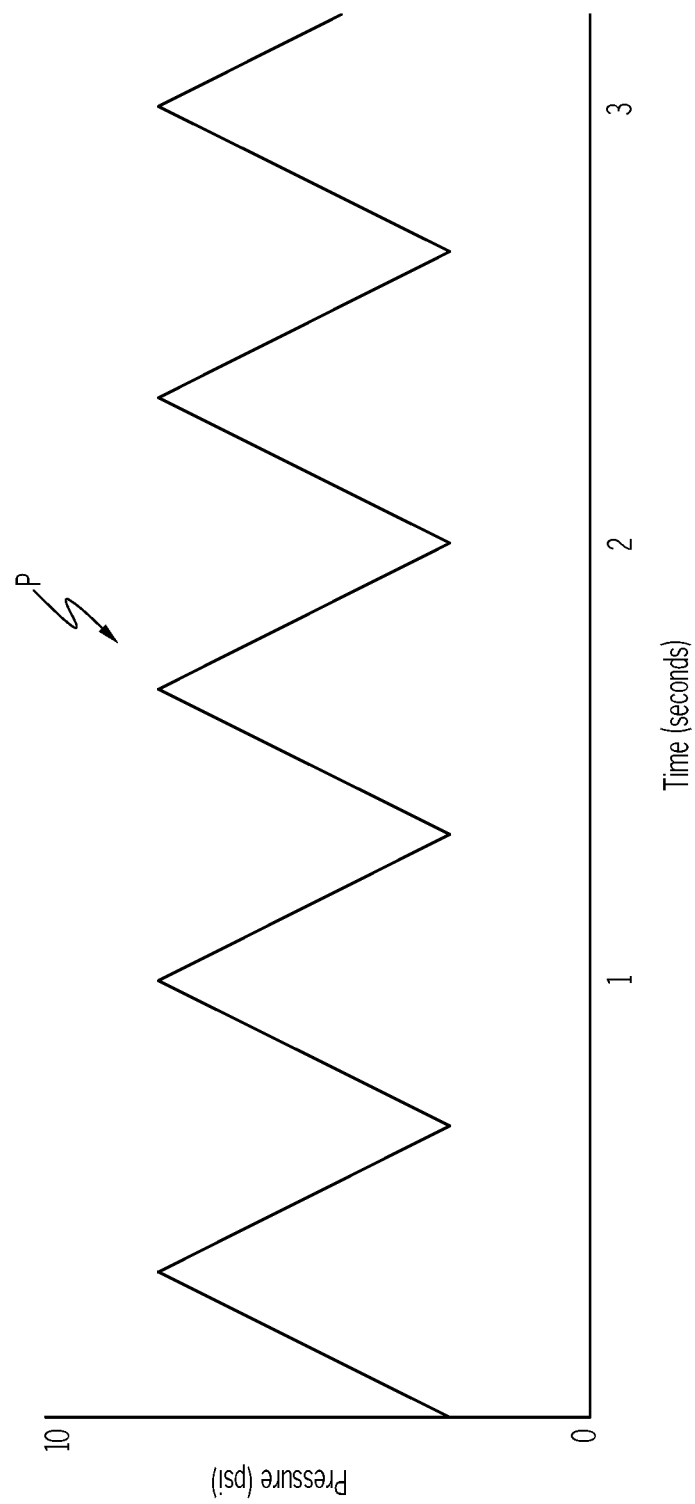
FIG. 9 is a graph depicting exemplary pressure versus time in a pressure chamber used to apply cyclic pressure to at least a portion of the free edge of the multilayer composite structure, wherein the pressure is shown cycling in the positive.

Non-limiting examples of the applied cyclic pressure (P) are graphically depicted in FIGS. 8 and 9. FIG. 8 depicts an exemplary plotting of pressure versus time, which shows the cyclic pressure (P) alternating between positive and negative (i.e., vacuum) values. FIG. 9 depicts an exemplary plotting of pressure versus time, exclusively positive.

Various techniques may be used to apply cyclic pressure (P) to the free edge (56) of the multilayer composite structure (50). Two non-limiting examples using a pressure chamber (110) are shown and described: (1) fluidly coupling a pressure chamber (110) with an external pressure source (120), as shown in FIG. 5, and (2) changing the volume of the pressure chamber (110), as shown in FIG. 6.

FIG. 4 depicts a system (100) for separating a first layer (52) from a second layer (54) of a multilayer composite structure (50) having a free edge (56). The system (100) includes a work surface (71) to which the multilayer composite structure (50) is secured. The system further includes a pressure housing (112) defining a pressure chamber (110) when the pressure housing (112) is secured against the multilayer composite structure (50), wherein a pressure (P) within in the pressure chamber (110) is cycled to initiate separation of the first layer (52) from the second layer (54).

Figure 5:
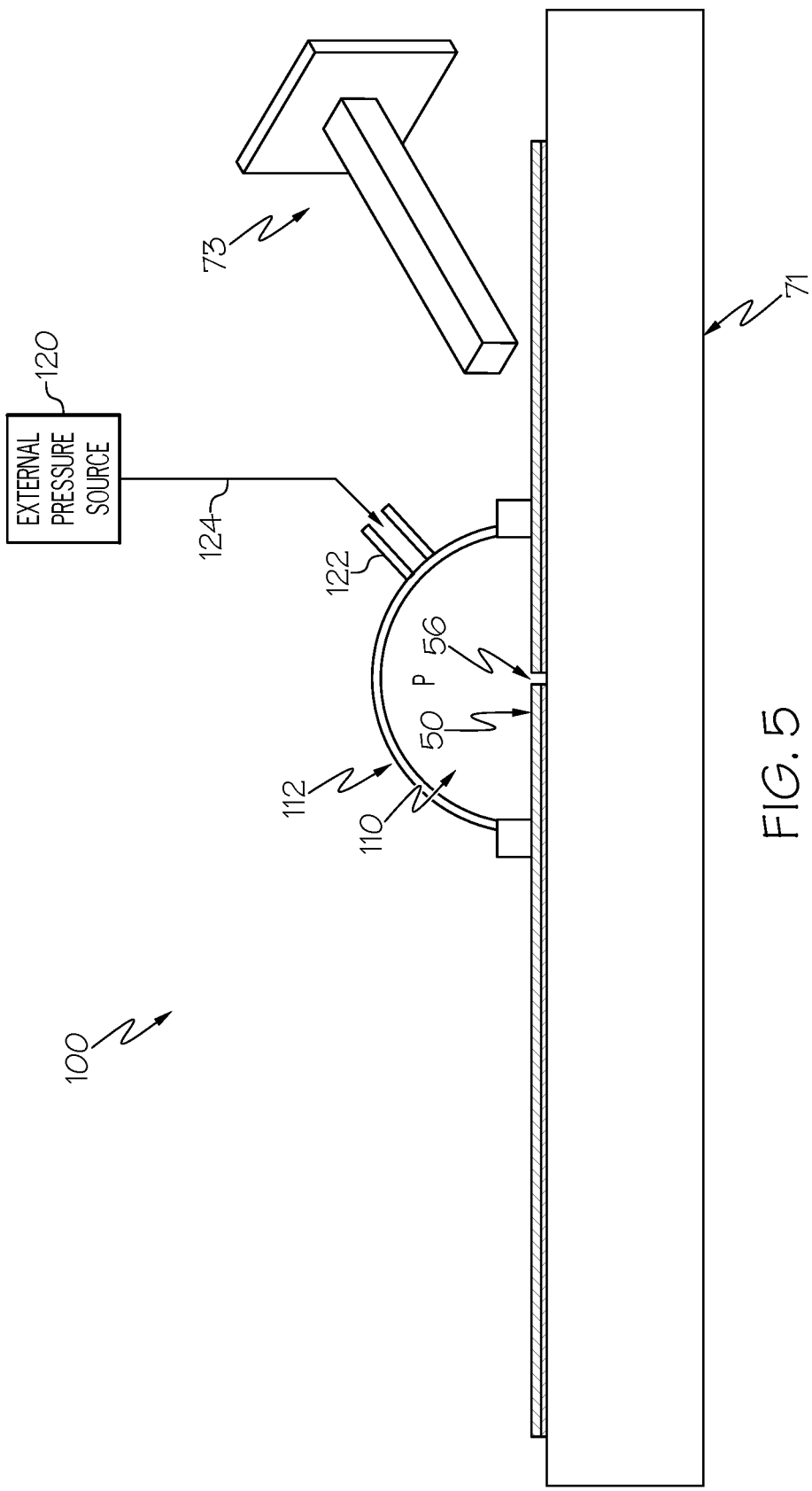
FIG. 5 is a side view of a multilayer composite structure secured to a work surface prior to removal of a backing film from a composite ply, wherein an external pressure source is used to apply cyclic pressure to at least a portion of the free edge of the multilayer composite structure.
Figure 6:
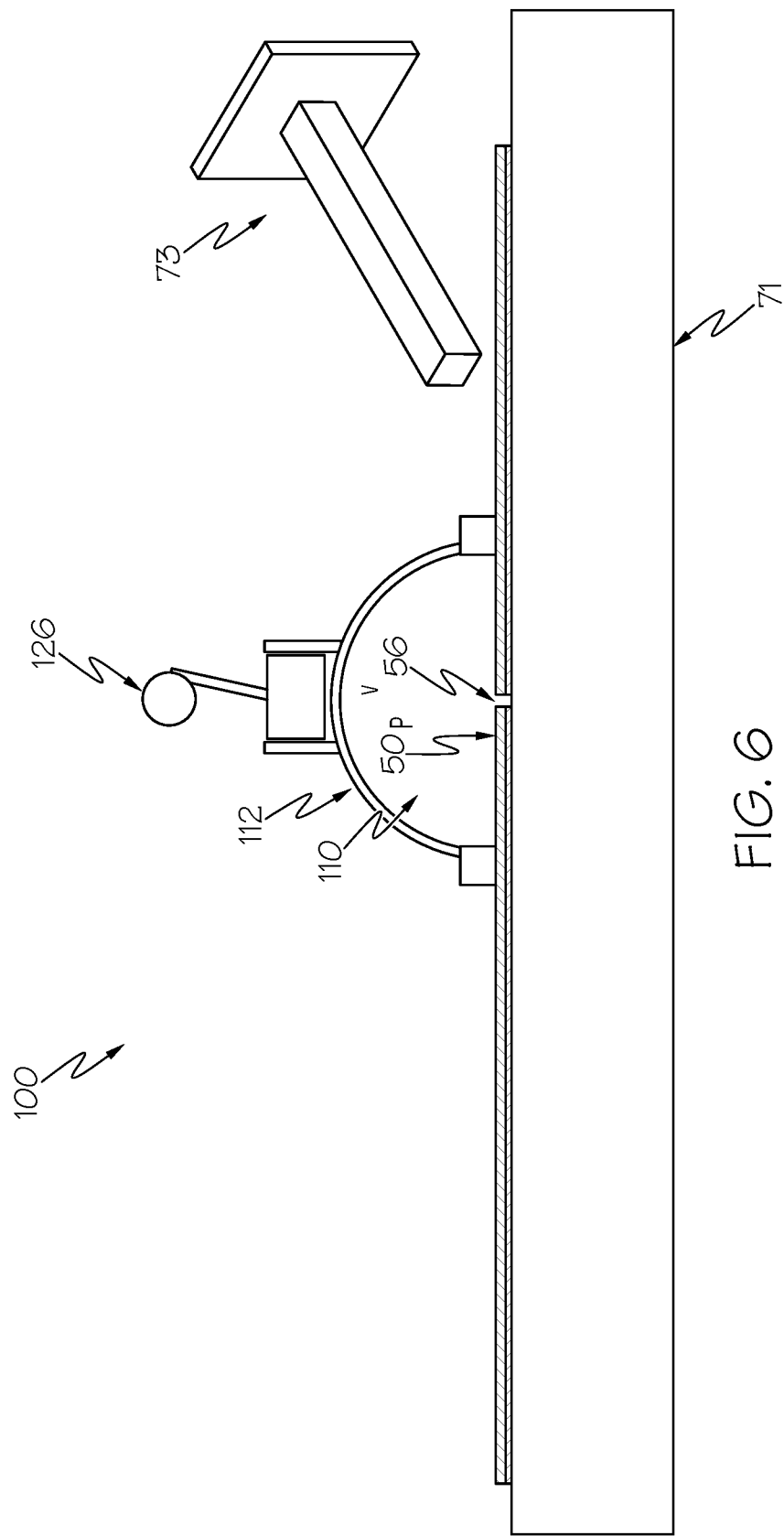
FIG. 6 is a side view of a multilayer composite structure secured to a work surface prior to removal of a backing film from a composite ply, wherein a volume change of the pressure housing defining a pressure chamber is used to apply cyclic pressure to at least a portion of the free edge of the multilayer composite structure.

FIG. 5 depicts an embodiment similar to that shown in FIG. 4. Notably, FIG. 5 differs from FIG. 4 in that it requires that the pressure housing (112) be rigid, that the internal pressure (P) of the pressure chamber (110) be modulated by way of an external pressure source (120), possibly through fluid communication between the pressure housing (112) and external pressure source (120) by way of a fluid port (122) and a fluid line (124). The external pressure source (120) may be, though is not limited to being, a positive pressure source or a vacuum source.

In additional examples, a rigid pressure chamber (110) may cycle pressure through ventilation or induction.

FIG. 6 depicts an embodiment similar to that shown in FIG. 4. Notably, FIG. 6 differs from FIG. 4 in that it requires a flexible pressure chamber (110). A plunging actuator (126) is engaged with the pressure chamber (110) and actuation of the plunging actuator (126) varies the volume (V) and, thus, the pressure (P) within the pressure chamber (110).

In additional examples, a flexible pressure chamber (110) may be actuated by a rotary, camshaft, or other compatible implement.

As shown in FIGS. 5 and 6, separation of the first layer (52) from the second layer (54) may be further assisted by actuating a cantilever beam (73). The cantilever beam (73) may vibrate such that vibrations are transmitted to the free edge (56) of the multilayer composite structure (50) during the application of cyclic pressure.

At this point, those skilled in the art will appreciate that the pressure (P) within the pressure chamber (110) may be cycled manually or automatically. In one implementation, the step of applying (16) cyclic pressure (P) to at least a portion (57) of the free edge (56) of the multilayer composite structure (50) may include applying (16) cyclic pressure (P) at a frequency of at least 2 Hz. In another implementation, the step of applying (16) cyclic pressure (P) to at least a portion (57) of the free edge (56) of the multilayer composite structure (50) may include applying (16) cyclic pressure (P) at a frequency of at least 4 Hz. In another implementation, the step of applying (16) cyclic pressure (P) to at least a portion (57) of the free edge (56) of the multilayer composite structure (50) may include applying (16) cyclic pressure (P) at a frequency of at least 6 Hz. In another implementation, the step of applying (16) cyclic pressure (P) to at least a portion (57) of the free edge (56) of the multilayer composite structure (50) may include applying (16) cyclic pressure (P) at a frequency of at least 8 Hz. In yet another implementation, the step of applying (16) cyclic pressure (P) to at least a portion (57) of the free edge (56) of the multilayer composite structure (50) may include applying (16) cyclic pressure (P) at a frequency of at least 10 Hz.

Figure 7:
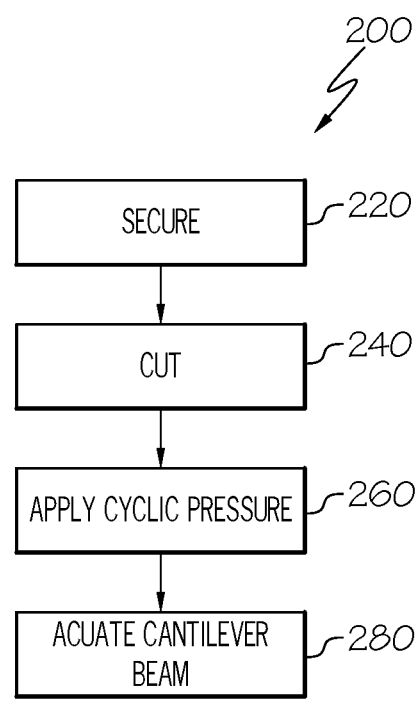
FIG. 7 is a flow diagram of another example of a method for separating a backing film from a composite ply.

Referring now to FIG. 7, in another example, the disclosed method for separating a backing film from a composite ply utilizes both cyclic pressure and a vibrating cantilever beam (73), as shown in FIGS. 5 and 6. The method (200) includes the step of securing (220) the multilayer composite structure (50) to a work surface (71), as shown in FIG. 3.

Referring to FIGS. 3 and 7, the method (200) further includes the step of cutting (240) a bulk sheet of multilayer composite material (66) to yield the multilayer composite structure (50) and a peripheral portion (51) separated from the multilayer composite structure (50) by a cut line (72).

The cutting (14) may be performed by a knife or the like, such as an ultrasonic knife. The cutting (14) may direct the cut line (72) entirely through the multilayer composite structure (50), down to the subjacent work surface (71). Care may be taken not to damage the subjacent work surface (71). The method (200) also includes the step of applying (260) cyclic pressure (P) to at least a portion (57) of the free edge (56) of the multilayer composite structure (50).

Referring now to FIGS. 4 and 7, the method (200) further includes the step of applying (240) cyclic pressure (P) to at least a portion (57) of the free edge (56) of the multilayer composite structure (50). The step of applying (16) cyclic pressure (P) to at least a portion (57) of the free edge (56) of the multilayer composite structure (50) may induce vibrations within the multilayer composite structure (50), which may weaken the connection between the backing film (60) and the composite ply (58).

Non-limiting examples of the applied cyclic pressure (P) are graphically depicted in FIGS. 8 and 9. FIG. 8 depicts an exemplary plotting of pressure versus time, which shows the cyclic pressure (P) alternating between positive and negative (i.e., vacuum) values. FIG. 9 depicts an exemplary plotting of pressure versus time, exclusively positive. In one implementation, the step of applying (16) cyclic pressure (P) to at least a portion (57) of the free edge (56) of the multilayer composite structure (50) may include applying (16) cyclic pressure (P) at a frequency of at least 2 Hz.

The method (200) further includes the step of actuating (280) a cantilever beam (73) to induce vibrations and transferring those vibrations into the multilayer composite structure (50). The steps of applying (260) and actuating (280) may be performed separately (actuating (280) after applying (260)) or simultaneously.

Figure 10:
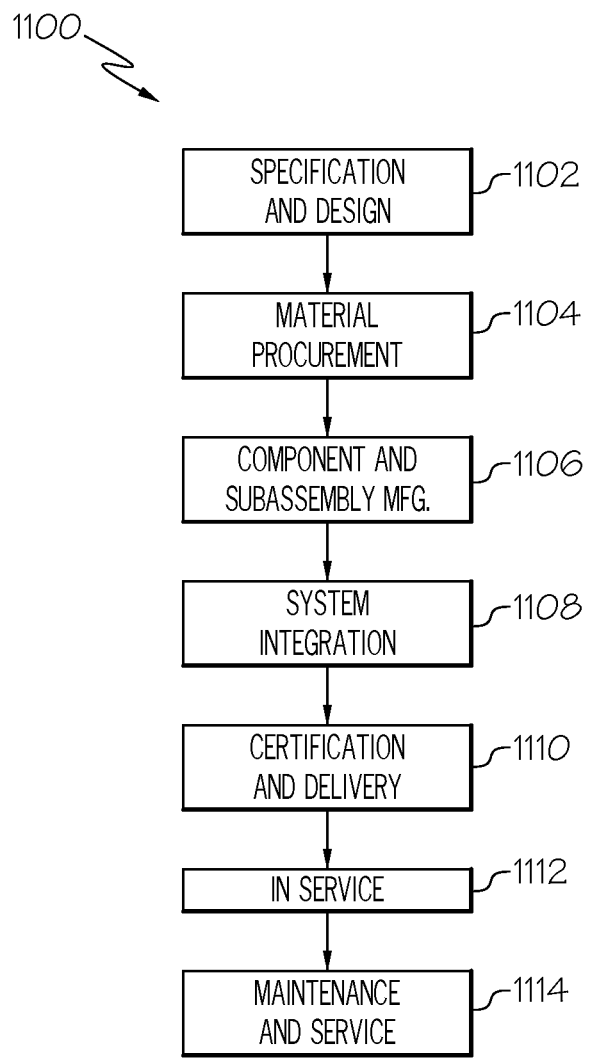
FIG. 10 is a block diagram of aircraft production and service methodology.
Figure 11:
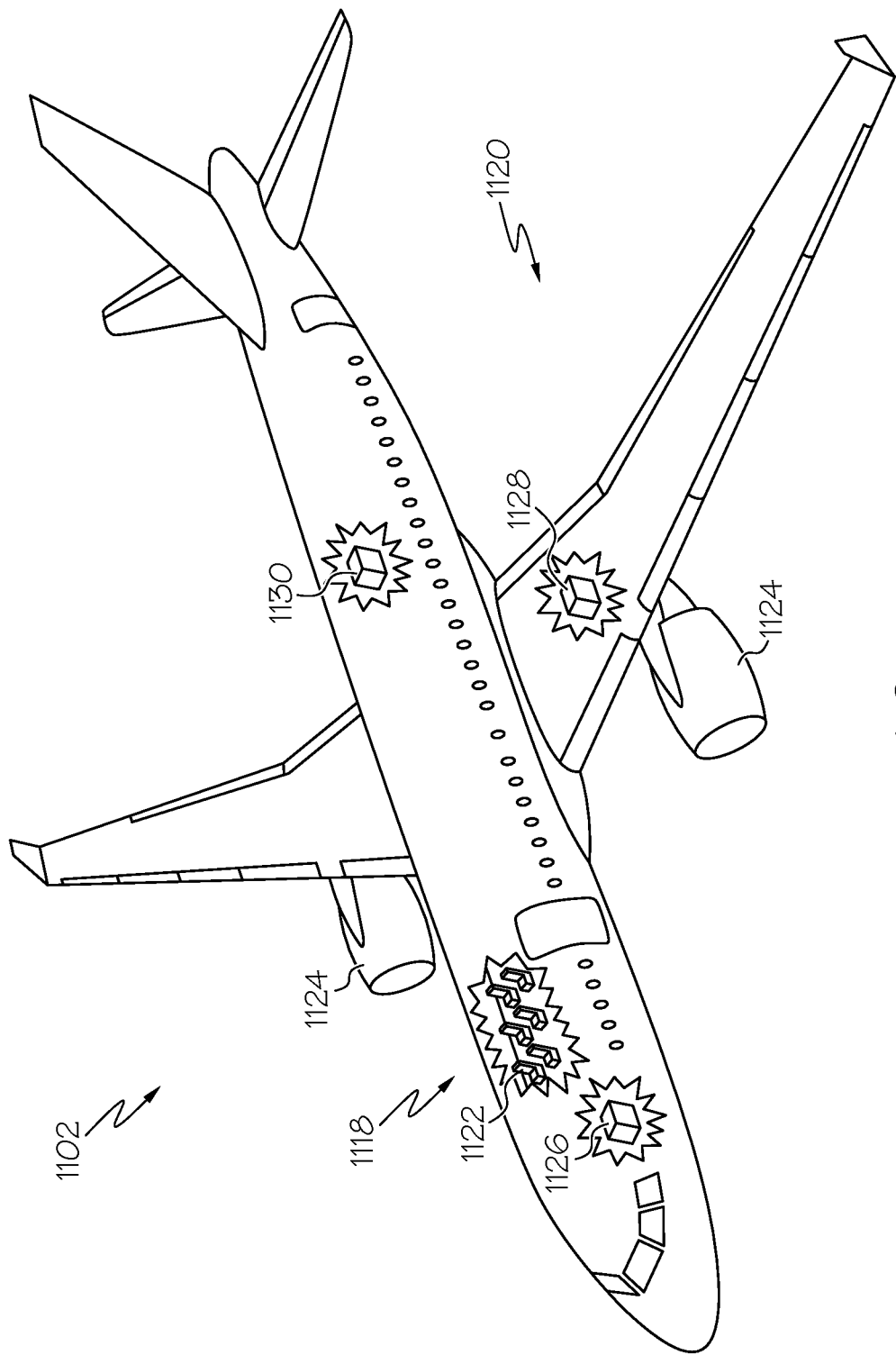
FIG. 11 is a schematic illustration of an aircraft.

Examples of the subject matter disclosed herein may be described in the context of aircraft manufacturing and service method 1100 as shown in FIG. 9 and aircraft 1102 as shown in FIG. 10. In one or more examples, the disclosed systems and methods for initiating layer separation within a multilayer composite structure may be used in aircraft manufacturing. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, aircraft 1102 produced by illustrative method 1100 may include airframe 1118 with a plurality of high-level systems 1120 and interior 1122. Examples of high-level systems 1120 include one or more of a propulsion system 1124, an electrical system 1126, a hydraulic system 1128, and an environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

The disclosed systems and methods for initiating layer separation within a multilayer composite structure may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus (es), method(s), or combination thereof may be utilized during production stages (block 1108 and block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Although various examples of the disclosed systems and methods for initiating layer separation within a multilayer composite structure have been shown and described, modifications may occur to those skilled in the art upon reading the specification. The present application includes such modifications and is limited only by the scope of the claims.

What is claimed is:

1. A method for initiating separation of a first layer from a second layer of a multilayer composite structure having a free edge, the method comprising:
    securing the multilayer composite structure to a work surface; and
    applying cyclic pressure to at least a portion of the free edge of the multilayer composite structure,
    wherein the applying the cyclic pressure comprises defining a pressure chamber such that the portion of the free edge of the multilayer composite structure is received within the pressure chamber, and
    wherein the pressure chamber is at least partially defined by sealingly engaging a pressure housing with the multilayer composite structure.

2. The method of claim 1 wherein the applying the cyclic pressure is performed at least until the first layer begins to separate from the second layer proximate the portion of the free edge of the multilayer composite structure.

3. The method of claim 1 wherein the applying the cyclic pressure further comprises fluidly coupling the pressure chamber with an external pressure source.

4. The method of claim 1 wherein the pressure chamber has a volume, and wherein the applying the cyclic pressure further comprises changing the volume of the pressure chamber.

5. The method of claim 1 wherein the cyclic pressure has a frequency of at least 2 cycles per second.

6. The method of claim 1 wherein one of the first layer and the second layer comprises a composite ply and another of the first layer and the second layer comprises a backing film connected to the composite ply.

7. A method for initiating separation of a first layer from a second layer of a multilayer composite structure having a free edge, wherein one of the first layer and the second layer comprises a composite ply and another of the first layer and the second layer comprises a backing film connected to the composite ply, the method comprising:
    securing the multilayer composite structure to a work surface;
    cutting a bulk sheet of multilayer composite material to yield the multilayer composite structure and a peripheral portion separated from the multilayer composite structure by a cut line; and
    applying cyclic pressure to at least a portion of the free edge of the multilayer composite structure while engaging the multilayer composite structure with a vibrating cantilever beam,
    wherein the applying the cyclic pressure comprises defining a pressure chamber such that the portion of the free edge of the multilayer composite structure is received within a pressure chamber, and
    wherein the pressure chamber is at least partially defined by sealingly engaging a pressure housing with the multilayer composite structure.

8. The method of claim 7 wherein the pressure chamber has a volume, and wherein the applying the cyclic pressure further comprises changing the volume of the pressure chamber.

9. The method of claim 7 wherein the pressure housing is a flexible structure.

10. A system for separating a first layer from a second layer of a multilayer composite structure having a free edge, the system comprising:
    a work surface to which the multilayer composite structure is secured; and
    a pressure housing that sealingly engages with the multilayer composite structure to define a pressure chamber, wherein a pressure within the pressure chamber is cycled to initiate separation of the first layer from the second layer.

11. The system of claim 10 further comprising an external pressure source, wherein the pressure chamber is in fluid communication with the external pressure source.

12. The system of claim 11 wherein the pressure housing is a substantially rigid structure.

13. The system of claim 10 wherein the pressure housing is a flexible structure.

14. The system of claim 13 further comprising a plunging actuator positioned to engage the pressure housing, wherein manipulation of the plunging actuator relative to the pressure housing controls a volume of the pressure chamber and, thus, the pressure within the pressure chamber.

15. The system of claim 14 wherein operation of the plunging actuator varies between automated and manual operation.

16. The system of claim 10 further comprising a seal positioned between the pressure housing and the multilayer composite structure.

17. The system of claim 10 wherein one of the first layer and the second layer comprises a composite ply and another of the first layer and the second layer comprises a backing film connected to the composite ply.

18. The system of claim 10 wherein the pressure within the pressure chamber is cycled at a frequency of at least 2 Hz.

19. The system of claim 10 wherein the pressure within the pressure chamber is cycled at a frequency of at least 4 Hz.

20. The system of claim 10 further comprising a vibrating cantilever beam engaging the multilayer composite structure proximate the pressure housing.

\* \* \* \* \*